(12) United States Patent
Takai et al.

(10) Patent No.: US 8,010,489 B2
(45) Date of Patent: Aug. 30, 2011

(54) CONTENT COMMUNICATION SYSTEM, CONTENT COMMUNICATION METHOD, AND COMMUNICATION TERMINAL APPARATUS

(75) Inventors: Motoyuki Takai, Tokyo (JP); Nobuyuki Idei, Tokyo (JP); Yoichiro Sako, Tokyo (JP); Toshiro Terauchi, Tokyo (JP); Mitsuru Takehara, Tokyo (JP); Yasushi Miyajima, Kanagawa (JP)

(73) Assignee: Sony Corporation, Tokyo (JP)

( * ) Notice: Subject to any disclaimer, the term of this patent is extended or adjusted under 35 U.S.C. 154(b) by 305 days.

(21) Appl. No.: 11/507,328

(22) Filed: Aug. 21, 2006

(65) Prior Publication Data

US 2007/0067311 A1 Mar. 22, 2007

(30) Foreign Application Priority Data

Aug. 22, 2005 (JP) ................. 2005-240315

(51) Int. Cl.
*G06F 17/30* (2006.01)
(52) U.S. Cl. ....................... 707/628; 709/203
(58) Field of Classification Search .................. 709/203; 707/628
See application file for complete search history.

(56) References Cited

U.S. PATENT DOCUMENTS

| | | | |
|---|---|---|---|
| 5,002,491 A * | 3/1991 | Abrahamson et al. | 434/322 |
| 6,349,275 B1 | 2/2002 | Schumacher et al. | |
| 6,389,222 B1 * | 5/2002 | Ando et al. | 386/95 |
| 6,704,729 B1 | 3/2004 | Klein et al. | |
| 6,807,558 B1 * | 10/2004 | Hassett et al. | 709/203 |
| 6,839,680 B1 * | 1/2005 | Liu et al. | 705/10 |
| 6,944,542 B1 * | 9/2005 | Eschenbach | 701/220 |
| 2001/0055038 A1 * | 12/2001 | Kim | 345/810 |
| 2003/0018622 A1 | 1/2003 | Chau | |
| 2004/0044724 A1 * | 3/2004 | Bell et al. | 709/203 |
| 2004/0049405 A1 * | 3/2004 | Buerger et al. | 705/1 |
| 2004/0259529 A1 * | 12/2004 | Suzuki | 455/411 |

FOREIGN PATENT DOCUMENTS

| | | |
|---|---|---|
| JP | 2001-282813 A | 10/2001 |
| JP | 2001-297090 A | 10/2001 |
| JP | 2002-092013 A | 3/2002 |
| JP | 2003-162285 A | 6/2003 |
| JP | 2003-224677 A | 8/2003 |
| JP | 2004-78467 A | 3/2004 |
| JP | 2004-185535 A | 7/2004 |
| JP | 2004-222239 A | 8/2004 |
| JP | 2004-282775 A | 10/2004 |

* cited by examiner

*Primary Examiner* — Shahid A Alam
*Assistant Examiner* — Dawaune Conyers
(74) *Attorney, Agent, or Firm* — Wolf, Greenfield & Sacks, P.C.

(57) ABSTRACT

A content communication system is disclosed which includes a communication terminal apparatus and a server, the apparatus having category IDs, the server delivering contents corresponding to the category IDs. The communication terminal apparatus includes a category holding device that holds a category ID; a sender device that sends the category IDs; a receiver device that receives contents from the server; and a storage device that stores the received contents. The server includes a receiver device that receives category IDs from the communication terminal apparatus; a database device that stores the contents corresponding to the categories; a search device that searches for and retrieves the contents corresponding to the main category and the sub-categories represented by the received category IDs from the database device; and a sender device that sends the retrieved contents to the communication terminal apparatus.

21 Claims, 11 Drawing Sheets

FIG. 2

EXAMPLES OF BIT ASSIGNMENTS

| MAIN CATEGORY | BIT ASSIGNMENTS |
|---|---|
| M1 | 00000001h |
| M2 | 00000002h |
| M3 | 00000003h |
| M4 | 00000004h |

| SUB CATEGORY A | BIT ASSIGNMENTS |
|---|---|
| A1 | 01h |
| A2 | 02h |
| A3 | 03h |
| A4 | 04h |
| A5 | 05h |
| A6 | 06h |

| SUB CATEGORY B | BIT ASSIGNMENTS |
|---|---|
| B1 | 01h |
| B2 | 02h |
| B3 | 03h |
| B4 | 04h |
| B5 | 05h |
| B6 | 06h |
| B7 | 07h |
| B8 | 08h |
| B9 | 09h |
| B10 | 0Ah |

FIG. 3A

CATEGORY ID'S
WHERE SUB-CATEGORY COUNT IS FIXED

| MAIN CATEGORY 32 BITS | SUB-CATEGORY 1 8 BITS | SUB-CATEGORY 2 8 BITS | SUB-CATEGORY 3 8 BITS |
|---|---|---|---|

FIG. 3B

CATEGORY ID'S
WHERE SUB-CATEGORY COUNT IS VARIABLE

| MAIN CATEGORY 32 BITS | SUB-CATEGORY COUNT 8 BITS | SUB-CATEGORY 1 8 BITS | SUB-CATEGORY 2 8 BITS | ... | SUB-CATEGORY N 8 BITS |
|---|---|---|---|---|---|

FIG. 4A

ID'S EXPRESSED IN FIXED LENGTH

| MAIN CATEGORY | SUB-CATEGORY 1 | SUB-CATEGORY 2 | SUB-CATEGORY 3 |
|---|---|---|---|
| 00000001h | 02h | 03h | 00h |

FIG. 4B

ID'S EXPRESSED IN VARIABLE LENGTH

| MAIN CATEGORY | SUB-CATEGORY COUNT | SUB-CATEGORY 1 | SUB-CATEGORY 2 |
|---|---|---|---|
| 00000001h | 02h | 02h | 03h |

CONTENT COMMUNICATION SYSTEM, CONTENT COMMUNICATION METHOD, AND COMMUNICATION TERMINAL APPARATUS

CROSS REFERENCES TO RELATED APPLICATIONS

The present invention contains subject matter related to Japanese Patent Application JP 2005-240315 filed with the Japanese Patent Office on Aug. 22, 2005, the entire contents of which being incorporated herein by reference.

BACKGROUND OF THE INVENTION

1. Field of the Invention

The present invention relates to a content communication system, a content communication method, and a communication terminal apparatus, the content communication system being made up of communication terminal apparatuses and a server, each of the communication terminal apparatus having category IDs established therein, the server delivering contents corresponding to the established category IDs.

2. Description of the Related Art

Recent years have seen the emergence of information communication systems each constituted by a server that delivers contents and various services and by user terminals (communication terminal apparatuses) that are connected to the server via a communication network. This type of information communication system is known to have its server provide information tailored to each user's needs. Users are expected to register their desired search conditions with the server of the system in advance. The server then searches for information that matches each user's predetermined conditions and delivers the retrieved information to the user. This is how each user can selectively acquire necessary information.

Illustratively, Japanese Patent Laid-open No. 2004-078467 discloses an information distribution system for use with mobile communication terminals. The disclosed system is shown providing the user of each mobile communication terminal automatically with information that matches the user's needs in a suitably timed manner.

In another example, Japanese Patent Laid-open No. 2003-224677 discloses an information delivery system, an information processing apparatus, and an information processing method whereby mobile phones are each furnished with an RFID (Radio Frequency Identification) tag. The RFID tag accommodates information such as an e-mail address and a Bluetooth (trademark) ID needed by the user of each mobile phone to receive services. An RFID reader of communication equipment acquires RFID tag information from a given mobile phone. Based on the acquired information, a Bluetooth module of the communication equipment communicates wirelessly with a Bluetooth module of the mobile phone and prompts the mobile phone to establish a dial-up IP connection with the network. With the IP connection established, the Bluetooth module of the communication equipment supplies an information delivery server with an advertisement ID and the e-mail address of the mobile phone. In turn, the information delivery server sends advertisement data corresponding to the advertisement ID to the e-mail address of the mobile phone.

SUMMARY OF THE INVENTION

In the information communication systems outlined above, where contents are to be acquired through a communication terminal apparatus, category settings are often too wide-ranging or too complex for the user to establish with ease. That makes it difficult for the user to obtain desired contents easily or even discourages the user from deciding to buy contents in the first place.

The present invention has been made in view of the above circumstances and provides a content communication system, a content communication method, and a communication terminal apparatus for allowing a user readily to obtain contents in desired categories through simple acquisition of the communication terminal apparatus, part of the categories being made changeable even after the acquisition of the apparatus.

In carrying out the present invention and according to one embodiment thereof, there is provided a content communication system including a communication terminal apparatus and a server, the communication terminal apparatus having category IDs, the server delivering contents corresponding to the category IDs; wherein the communication terminal apparatus includes: a category holding device configured to hold a category ID representing a fixedly predetermined main category and category IDs representing a variable number of sub-categories subsumed under the main category; a sender device configured to send the category IDs representing the main category and the sub-categories subsumed under the main category from the category holding device to the server; a receiver device configured to receive contents from the server; and a storage device configured to store the received contents; and wherein the server includes: a receiver device configured to receive category IDs from the communication terminal apparatus; a database device configured to store the contents corresponding to the categories; a search device configured to search for and retrieve the contents corresponding to the main category and the sub-categories represented by the received category IDs from the database device; and a sender device configured to send the retrieved contents to the communication terminal apparatus.

The category holding device may preferably be housed in a module removably attachable to the communication terminal apparatus. This structure makes it possible for the user to remove only module from the old communication terminal apparatus and attach to a new communication terminal apparatus when the user purchases the new one. Preferably, the communication terminal apparatus may be capable of communicating with another communication terminal apparatus for exchange of the category IDs retrieved from the category holding device of each communication terminal apparatus, and the contents corresponding to the received category IDs may be retrieved from the storage device and sent from one communication terminal apparatus to the other communication terminal apparatus.

According to another embodiment of the present invention, there is provided a content communication method for sending and receiving contents between a communication terminal apparatus and a server, the communication terminal apparatus having category IDs, the server delivering the contents corresponding to the category IDs, the content communication method including the steps of: causing the communication terminal apparatus to send to the server an ID representing a fixedly predetermined main category and IDs representing a variable number of sub-categories subsumed under the main category; causing the communication terminal apparatus to receive contents from the server; causing the communication terminal apparatus to store the received contents into a storage device; causing the server to receive category IDs from the communication terminal apparatus; causing the server to search for and retrieve the contents corresponding to the main category and the sub-categories represented by the received category IDs from a database device which stores the contents corresponding to the categories; and causing the server to send the retrieved contents to the communication terminal apparatus.

According to a further embodiment of the present invention, there is provided a communication terminal apparatus for use with a content communication system constituted by the communication terminal apparatus and a server, the server delivering contents corresponding to the category IDs, the communication terminal apparatus including: a category holding device configured to hold a category ID representing a fixedly predetermined main category and category IDs representing a variable number of sub-categories subsumed under the main category; a sender device configured to send the category IDs representing the main category and the sub-categories subsumed under the main category from the category holding device to the server; a receiver device configured to receive contents from the server; and a storage device configured to store the received contents.

According to the present invention, as outlined above, the user need only acquire a communication terminal apparatus having a desired main category in order to download contents corresponding to the established category for personal enjoyment. Preferably, the user may set sub-categories under the main category so as to obtain contents more to his or her taste. Furthermore, contents may be exchanged between communication terminal apparatuses having the same category IDs.

Detailed description of the present embodiment of the invention will be hereinafter explained referring to the drawings.

BRIEF DESCRIPTION OF THE DRAWINGS

FIG. 2 is a tabular view showing examples of bit assignments as IDs (identification information) representative of main categories and sub-categories;

FIGS. 3A and 3B are schematic views showing recording formats of category IDs;

FIGS. 4A and 4B are schematic views showing examples of category IDs;

DETAILED DESCRIPTION OF THE PREFERRED EMBODIMENTS

Preferred embodiments of the present invention will now be described in detail with reference to the accompanying drawings.

Figure 1:
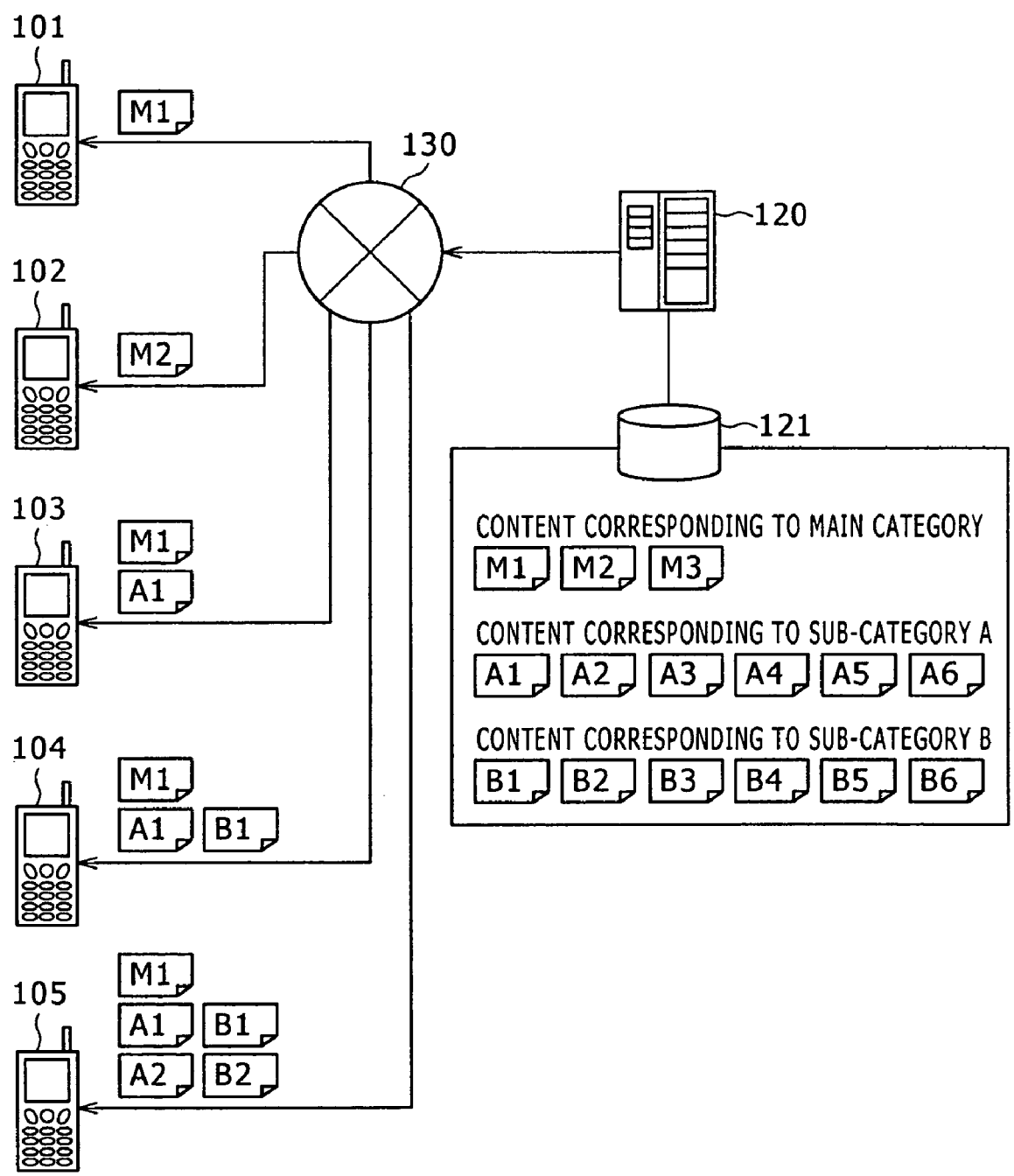
FIG. 1 is a block diagram outlining a configuration of a content communication system as an embodiment of the present invention.

FIG. 1 is a block diagram outlining a configuration of a content communication system as an embodiment of the present invention.

In FIG. 1, communication terminal apparatuses 101 through 105 are connected communicably to a server 120 that delivers contents via a network 130. That is, the apparatuses 101 through 105 are clients to the server 120. Typically, the network 130 may be the Internet and accessed in either wired or wireless fashion. The communication terminal apparatuses 101 through 105 each have category IDs established thereon. Category IDs are information which identifies and classifies contents in a layered structure made up of a main category and sub-categories. The communication terminal apparatuses 101 through 105 are each assigned a main category fixedly. Users may establish or change sub-categories subsumed under each main category.

It is assumed here that main categories are represented by reference characters M1, M2, M3, etc., and sub-categories by A1, A2, A3, etc., and by B1, B2, B3, etc.

Illustratively, the communication terminal apparatuses 101, 103 through 105 are each assigned the main category M1 and the communication terminal apparatus 102 is assigned the main category M2 in a fixed manner. Sub-categories may be established as desired on each terminal. For example, the sub-category A1 is set on the communication terminal apparatus 103; the sub-categories A1 and B1 are set on the communication terminal apparatus 104; and the sub-categories A1, A2, B1, and B3 are set on the communication terminal apparatus 105.

The server 120 is furnished with a database 121 that stores contents corresponding to the main categories M1, M2, M3, etc., and sub-categories A1, A2, A3, etc., as well as B1, B2, B3, etc. The contents may be any of such variations as music, voice, still pictures, moving pictures, text information, advertisement information, and meta data attached to contents, and any combination of these variations.

It might happen that a typical information communication system is configured with communication terminal apparatuses carried by users who watch soccer matches or take part in fan club activities. In such a case, the main categories M1, M2, M3, etc., may stand for soccer team names or for the names of countries. The sub-categories A1, A2, A3, etc., may denote player names and the sub-categories B1, B2, B3, etc., may represent position names. If the player names are placed in sub-categories A, for example, as mentioned above, then what is represented by the sub-categories A varies from one main category to another (i.e., from one team to another); if the position names are put in sub-categories B for example, they can be shared between different main categories. There may be established any desired combinations of main and sub-categories or any desired number of sub-categories subsumed under each main category, with matching contents offered according to the categories thus established.

When the communication terminal apparatuses 101 through 105 download contents from the server 120, the users may be charged for the contents differently from one category to another. For example, the contents corresponding to the main category may be offered free of charge or their prices may be included in the selling price of each communication terminal apparatus. Different prices may be set for different sub-categories, and the user may be charged for the downloaded contents according to the sub-category under which they fall. It is assumed here that a main category is established fixedly (i.e., unrewritably) on each of the communication terminal apparatuses 101 through 105 in advance (i.e. when they are shipped from the factory or when sold) and that the user who owns each apparatus is free to set sub-categories under the main category. The sub-category settings may be handled as desired on the communication terminal apparatus. Alternatively, the settings may be registered with a server or the like via the network or put into effect by use of a dedicated machine installed at shops or in service centers. In such cases, the user may be charged for registering sub-categories with the server or the like or for establishing sub-categories by resorting to the dedicated machine. In another typical system configuration, each communication terminal apparatus may be offered free of charge, and the user may be charged only for any sub-category contents that have been downloaded.

FIG. 2 is a tabular view showing examples of bit assignments as IDs (identification information) representative of main categories and sub-categories. In these examples, the main categories M1, M2, M3, etc., are each represented by an eight-digit hexadecimal number (in 32 bits=4 bytes) such as "00000001h" ("h" stands for a hexadecimal number); and the sub-categories A1, A2, A3, etc., and B1, B2, B3, etc., are each expressed by a two-digit hexadecimal number (in 8 bits =1 byte) such as "01h". In such cases, each main category may be assigned any one of the numbers "00000000h" through "FFFFFFFFh" as its ID in the 32-bit format; preferably, no significant main category should be assigned the number "00000000h." The number of sub-categories may be fixed beforehand or may be varied as needed. If the sub-category count is made variable, a sub-category count field may be placed next to the main category ID. If the sub-category count field is an eight-bit field, then up to 256 sub-categories may be established as desired.

FIGS. 3A and 3B show recording formats of category IDs in effect when the IDs are established on the communication terminal apparatus. FIG. 3A indicates the format applicable where the number of sub-categories is fixed, and FIG. 3B gives the format used when the number of sub-categories is variable. More specifically, FIG. 3A shows the format of category IDs in effect when the number of sub-categories is fixed to a maximum of three. In this format, a main category ID (in 32 bits) is followed by IDs for sub-categories 1, 2 and 3 (8 bits×3 =24 bits), in that order. If the sub-category ID is "00h," that means no significant sub-category has been established yet. FIG. 3B shows the format of category IDs in effect when the number of sub-categories is variable. In this format, the main category ID (in 32 bits) is followed by eight-bit sub-category count information indicating the number of sub-categories. To the right of the sub-category count information are IDs for sub-categories 1, 2, . . . , N (8 N bits), the number N being designated by the count information. The communication terminal apparatus may illustratively utilize a read-only memory (ROM) as the category holding device to hold the main category ID, and a nonvolatile (rewritable) memory as the category holding device to accommodate the sub-category IDs that are preferably written there by the user's setting operations.

FIGS. 4A and 4B show typical category IDs for use when the main category is M1 and the sub-categories are A2 and B3. Where the category IDs are to be expressed in a fixed length, the ID field for the main category may be loaded with "00000001h," the ID field for the sub-category 1 with "02h," the ID field for the sub-category 2 with "03h," and the ID field for the sub-category 3 with null characters "00h" indicative of non-use, as shown in FIG. 4A. Where the category IDs are to be expressed in a variable length, the ID field for the main category may be loaded with "00000001h" and the category count field with "02h". Next to the category count field are two sub-category ID fields, one loaded with "02h" for the sub-category 1 and the other with "03h" for the sub-category 2, as shown in FIG. 4B.

Storage of the above-described category IDs is not limited to the memory or similar category holding device inside the communication terminal apparatus. Alternatively, the IDs may be stored in a module as a category holding device that is removably attachable to the communication terminal apparatus. With this structure, the category settings of the communication terminal apparatus may be changed by simply switching the modules. When replacing the old communication terminal apparatus with a new one that has been bought, the user need only remove the module from the old apparatus and insert it into the newly purchased apparatus. Illustratively, the module may be a SIM (Subscriber Identify Module) card for use on digital mobile phones.

Figure 5:
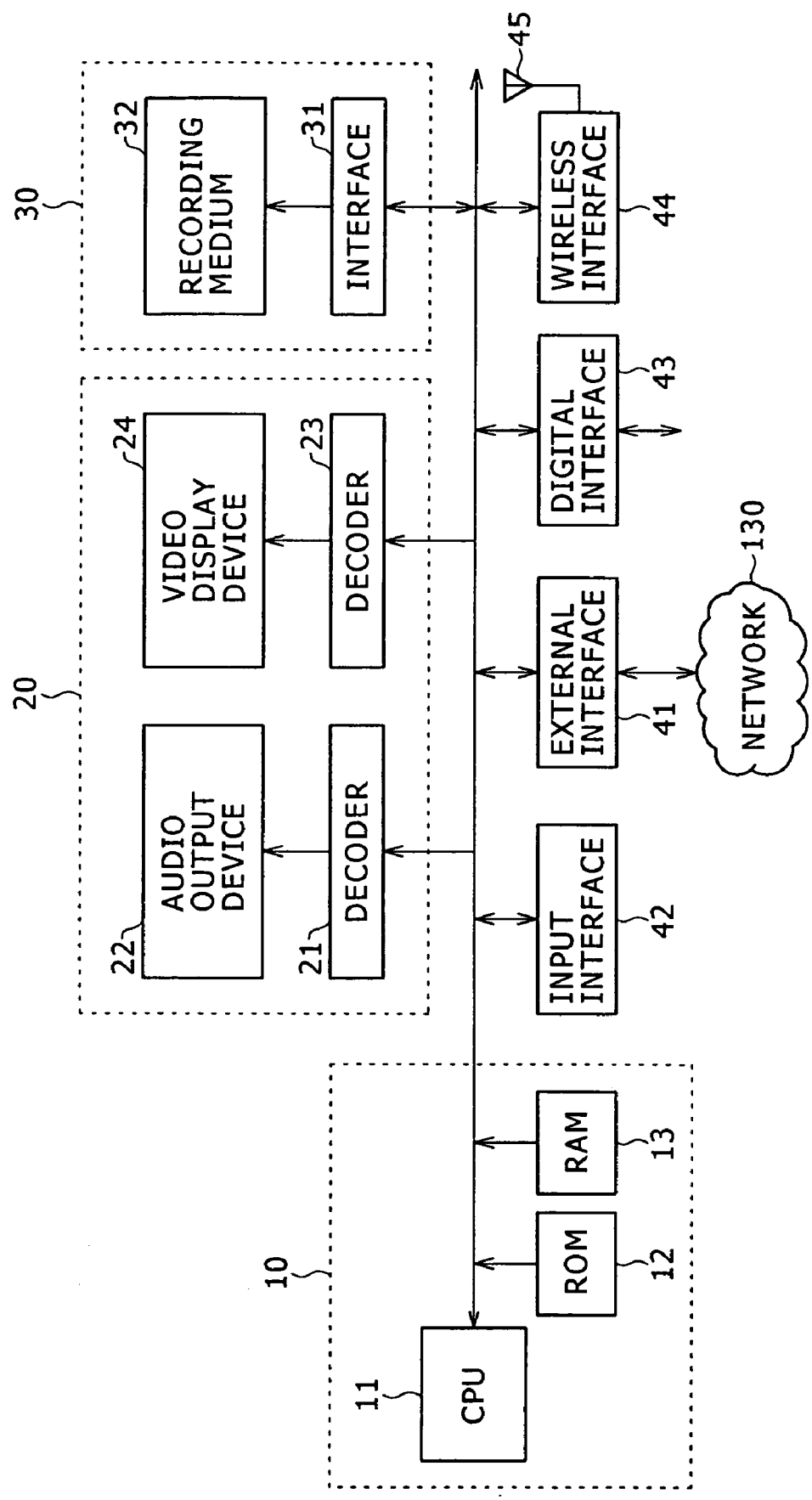
FIG. 5 is a block diagram of a content communication apparatus as a typical communication terminal apparatus.

Illustratively, the communication terminal apparatuses 101 through 105 may each be structured as shown in FIG. 5. FIG. 5 gives a block diagram of a content communication apparatus made up of a control device 10, an output device 20, a storage device 30, an external interface 41, an input interface 42, a digital interface 43, a wireless interface 44, and a sending and receiving antenna 45.

The control device 10 is a microcomputer constituted by a CPU (central processing unit) 11, a ROM (read only memory) 12 and a RAM (random access memory) 13, all interconnected by a CPU bus 14. In operation, the control device 10 controls the component devices making up this content communication apparatus.

The output device 20 includes an audio decoder 21, an audio output device 22, a video decoder 23, and a video display device 24. The audio output device 22 may be a speaker, and the video display device 24 may be an LCD (liquid crystal display), a PDP (plasma display panel), an organic EL (electroluminescence) display, a CRT (cathode-ray tube) or the like.

The storage device 30 has an interface 31 and a recording medium 32. The recording medium 32 may be a hard disk, a flash memory, an optical disk, a magneto-optical disk, a semiconductor memory, a flexible disk, or any of other variations of recording media.

Preferably, the recording medium 32 may be constituted by a plurality of hard disks, optical disks, or multiple pieces of the same type of media. Alternatively, the recording medium 32 may be a combination of a hard disk and an optical disk, a combination of an optical disk and a magneto-optical disk, or any other combination of different types of recording media.

The recording medium 32 stores audio content data, video content data, or AV content data to be reproduced. As will be discussed later, the recording medium 32 also stores the category IDs of each terminal apparatus or of the module connected thereto.

The external interface 41 of the content communication apparatus in this example is used to establish connection with the network 130. Through the external interface 41, the content communication apparatus may download audio content data, video content data, AV content data, text data, and other kinds of data from sources on the network 130. The downloaded data may be stored onto the recording medium 32 through the interface 31 of the storage device 30.

The input interface 42 is a key operation device that accepts the user's operation input. The operation input accepted through the input interface 42 is converted to an electrical signal that is fed to the control device 10. In turn, the control device 10 controls the content communication apparatus in a manner reflecting the user's operation input. In another example, the user may input his or her preferred sub-category settings through the input interface 42.

The digital interface 43 is based on the IEEE (Institute of Electrical and Electronics Engineers) 1394 standard, USB (Universal Serial Bus) standard, or some other suitable digital interface criteria. The digital interface 43 allows the content communication apparatus to connect to another electronic equipment through a dedicated line illustratively for exchanges of content data.

The wireless interface 44 together with the sending and receiving antenna 45 connects the content communication apparatus illustratively to a wireless LAN for exchanges of information with another apparatus. Through the wireless interface 44 and sending and receiving antenna 45, the content communication apparatus may receive content data from a wireless LAN system.

When the above type of content communication apparatus is used as the communication terminal apparatus, the category IDs are stored on the recording medium 32 of the storage device 30. In this case, it is preferred that the main category ID be recorded unrewritably when the apparatus is shipped or sold and that the sub-category IDs be recorded rewritably by the user as desired. Alternatively, the main category ID may be written to the ROM 12 inside the control device 10. As another alternative, the main category ID may be written to an unrewritable area or in an unrewritable format on a rewritable recording medium.

The category IDs stored on the recording medium 32 or the like in the storage device 30 are sent through the external interface 41 to other apparatuses including the server over the network such as the Internet. Alternatively, the category IDs may be sent and received through the wireless interface 44.

If an instruction is given through the input interface 42 to reproduce the desired content stored on the recording medium 32, the control device 10 supplies the target content data to the output device 20. The control device 10 causes the output device 20 to provide audio and/or video output reflecting the content data in question for the user's enjoyment.

Figure 6:
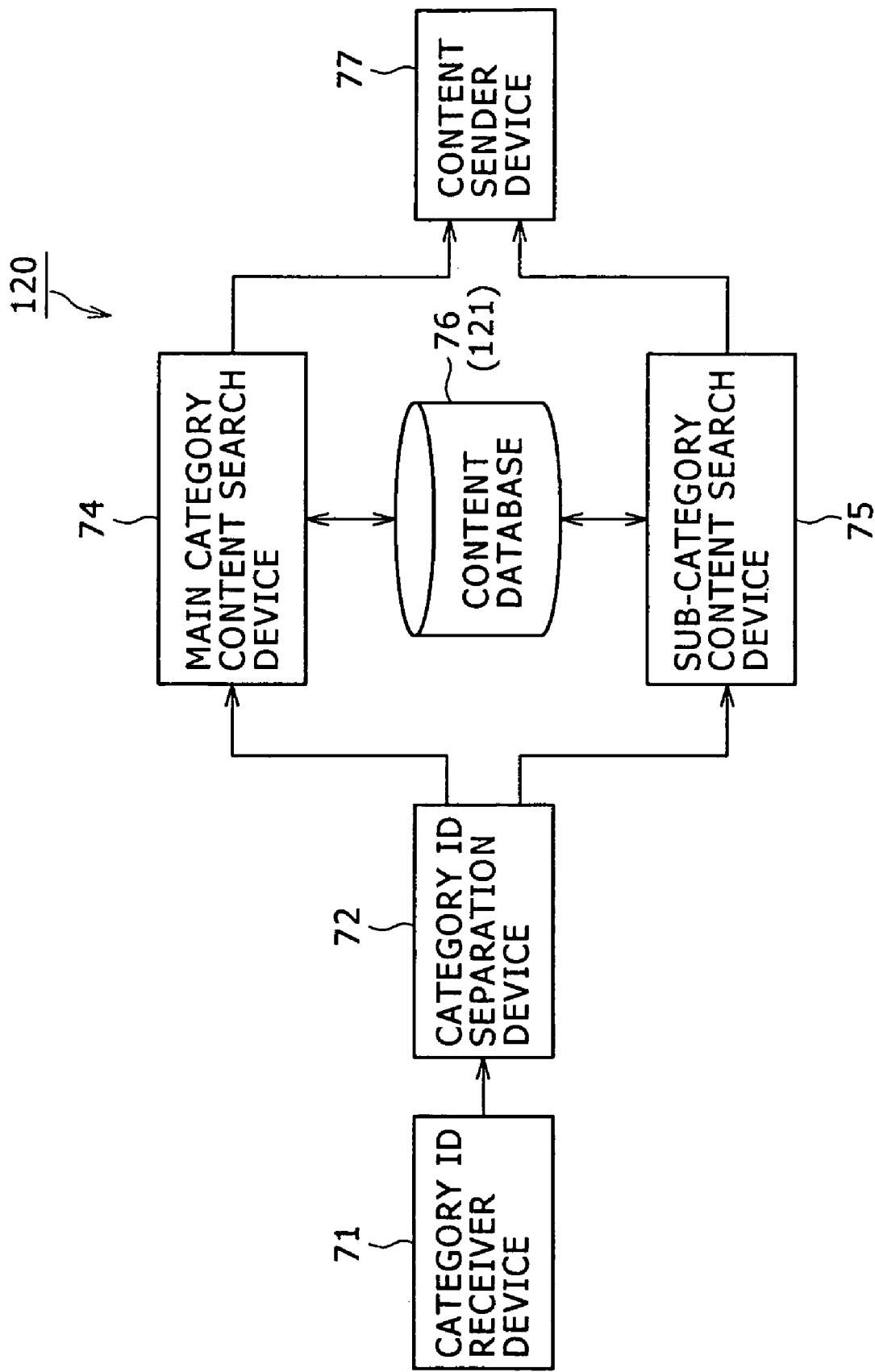
FIG. 6 is a function block diagram showing a structure of a server that delivers contents.

FIG. 6 is a function block diagram showing a structure of a server (i.e., server 120 in FIG. 1) that delivers contents to the communication terminal apparatus of the above-described structure. In FIG. 6, a category ID receiver device 71 is a functional section that receives category IDs from the above-described communication terminal apparatus (e.g., communication terminal apparatus 103 in FIG. 1). The received category IDs are forwarded to a category ID separation device 72. The category ID separation device 72 separates the received IDs into the main category ID and the sub-category IDs and sends the main category ID to a main category content search device 74 and the sub-category IDs to a sub-category content search device 75. For example, the category IDs received from the communication terminal apparatus 103 in FIG. 1 are separated into the ID for the main category M1 and the ID for the sub-category A1. The main category content search device 74 searches for and retrieves the content of the corresponding main category (e.g., M1) from a content database 76 (i.e., database 121 in FIG. 1), and forwards the retrieved content to a content sender device 77. The sub-category content search device 75 searches for and retrieves the content of the corresponding sub-category (e.g., A1) and forwards the retrieved content to the content sender device 77. In turn, the content sender device 77 sends the contents corresponding to the main category and sub-category to the above-described communication terminal apparatus (e.g., communication terminal apparatus 103 in FIG. 1).

Figure 7:
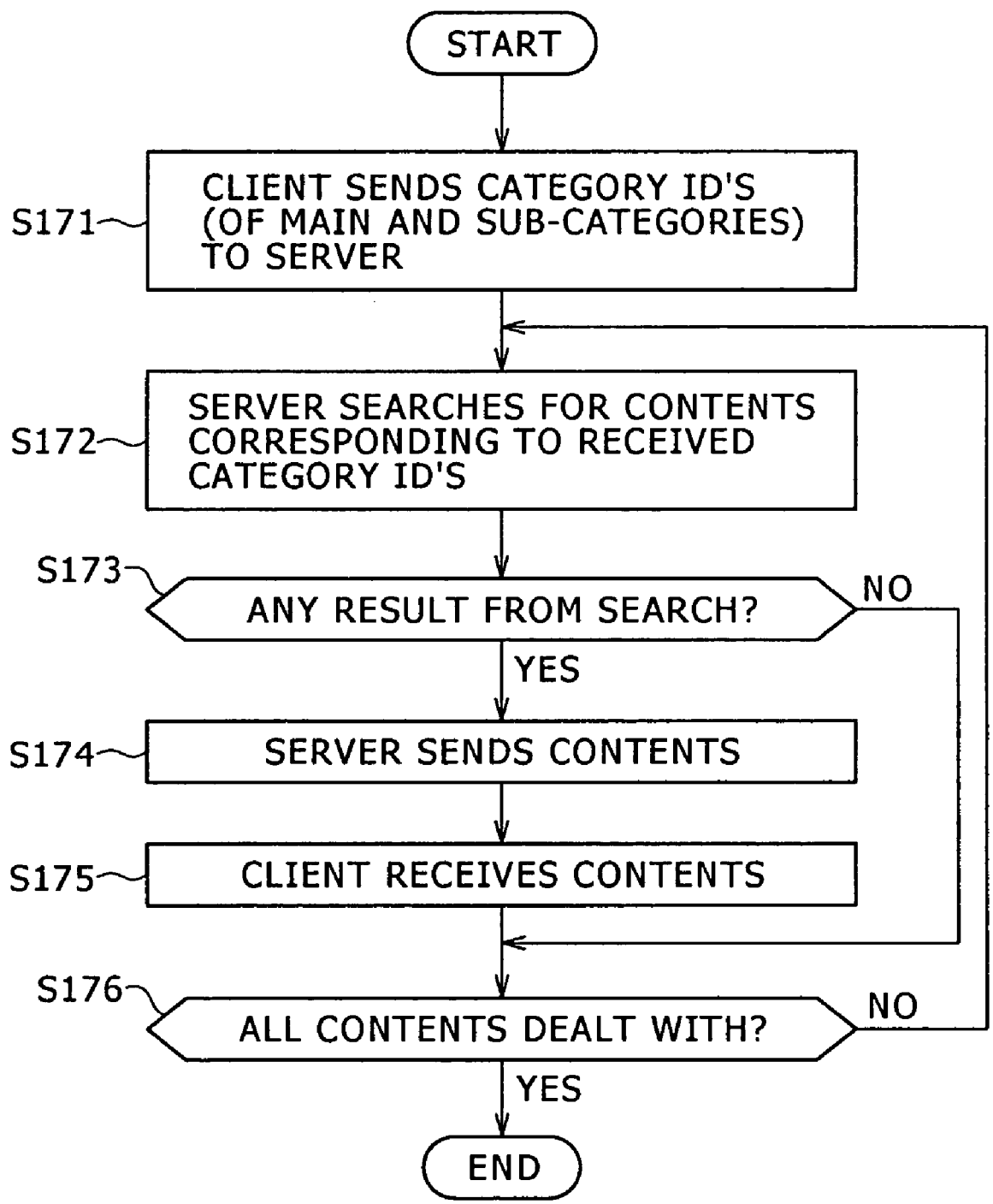
FIG. 7 is a flowchart of steps performed by the server and the communication terminal apparatus whereby contents are sent and received by way of communication.

Described below with reference to the flowchart of FIG. 7 is how contents are sent and received between the above-described server and its client (communication terminal apparatus) by way of communication. In step S171 of FIG. 7, the communication terminal apparatus sends the category IDs representative of the main and the sub-categories to the server. In step S172, the server searches for the contents corresponding to the received category IDs. The process of searching for contents will later be elaborated on in reference to FIGS. 8 and 9. In step S173, a check is made to determine whether any contents have resulted from the search. If the contents are found retrieved from the search ("Yes" in step S173), step S174 is reached in which the server sends the retrieved contents. In step S175, the client (communication terminal apparatus) receives the contents. In step S176, a check is made to determine whether the process of sending and receiving contents has come to an end. If no contents are found retrieved from the search ("No" in step S173), step S176 is reached immediately. When the process of sending and receiving contents is found coming to an end ("Yes" in step S176), the whole process is terminated. If the process of sending and receiving contents has not come to an end ("No" in step S176), then step S172 is reached again and the search for contents is continued.

The process of getting the communication terminal apparatus to send category IDs to the server and to download corresponding contents therefrom is initiated either manually by the user who desires to update contents, or automatically at a preprogrammed time. Illustratively, the communication terminal apparatus may be set to send category IDs automatically to the server at a predetermined time in the middle of the night. The server, for its part, searches for and retrieves the contents corresponding to the received category IDs and sends the retrieved contents to the communication terminal apparatus. At this point, the server may verify the most recent update time and date of the contents stored in the communication terminal apparatus and send only the contents that have been updated since that time. In another example, independently of requests from the communication terminal apparatus, the server may automatically send contents thereto periodically or whenever the contents have been updated.

Figure 8:
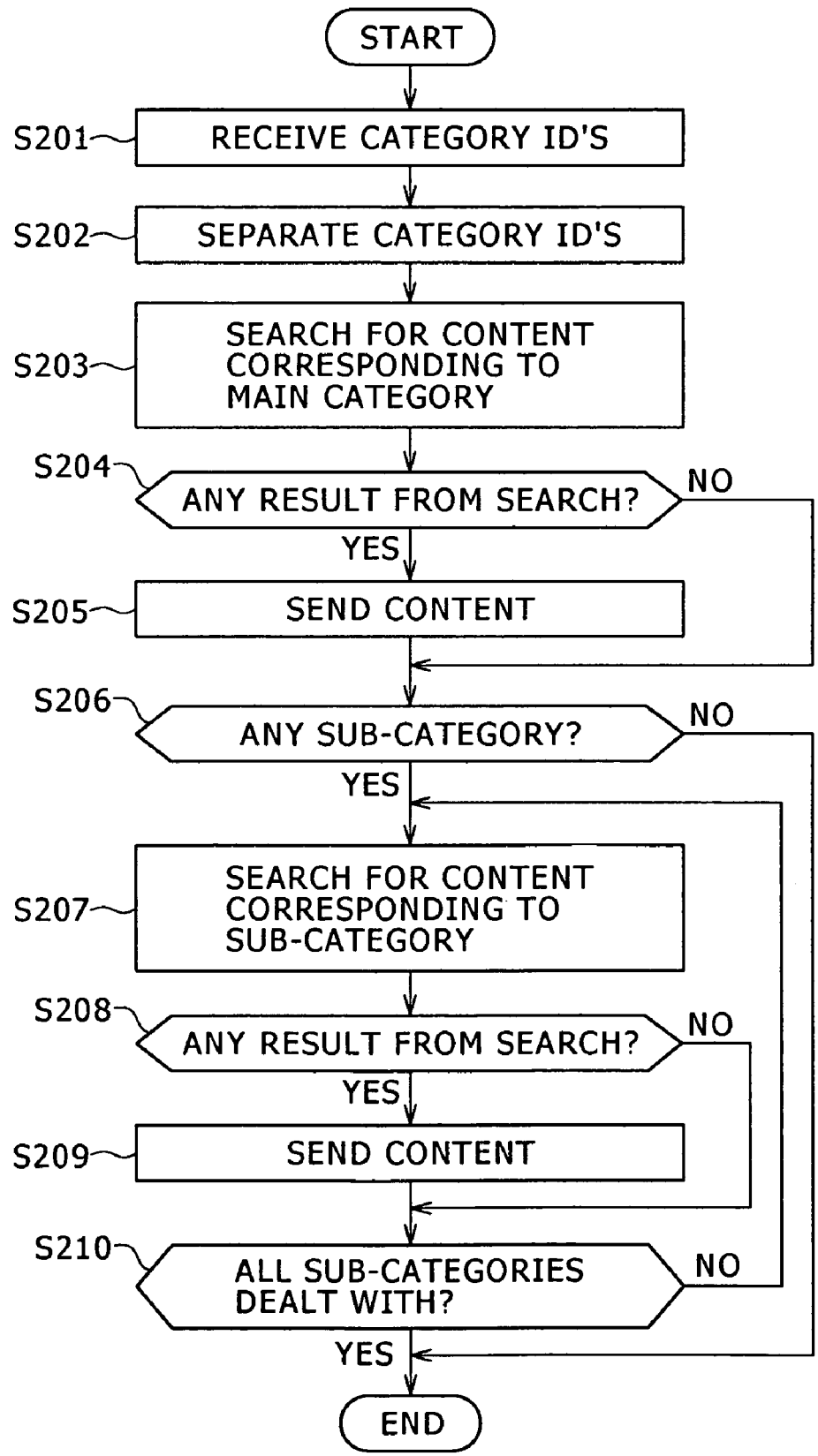
FIG. 8 is a flowchart of steps performed by the server when contents are sent and received.
Figure 9:
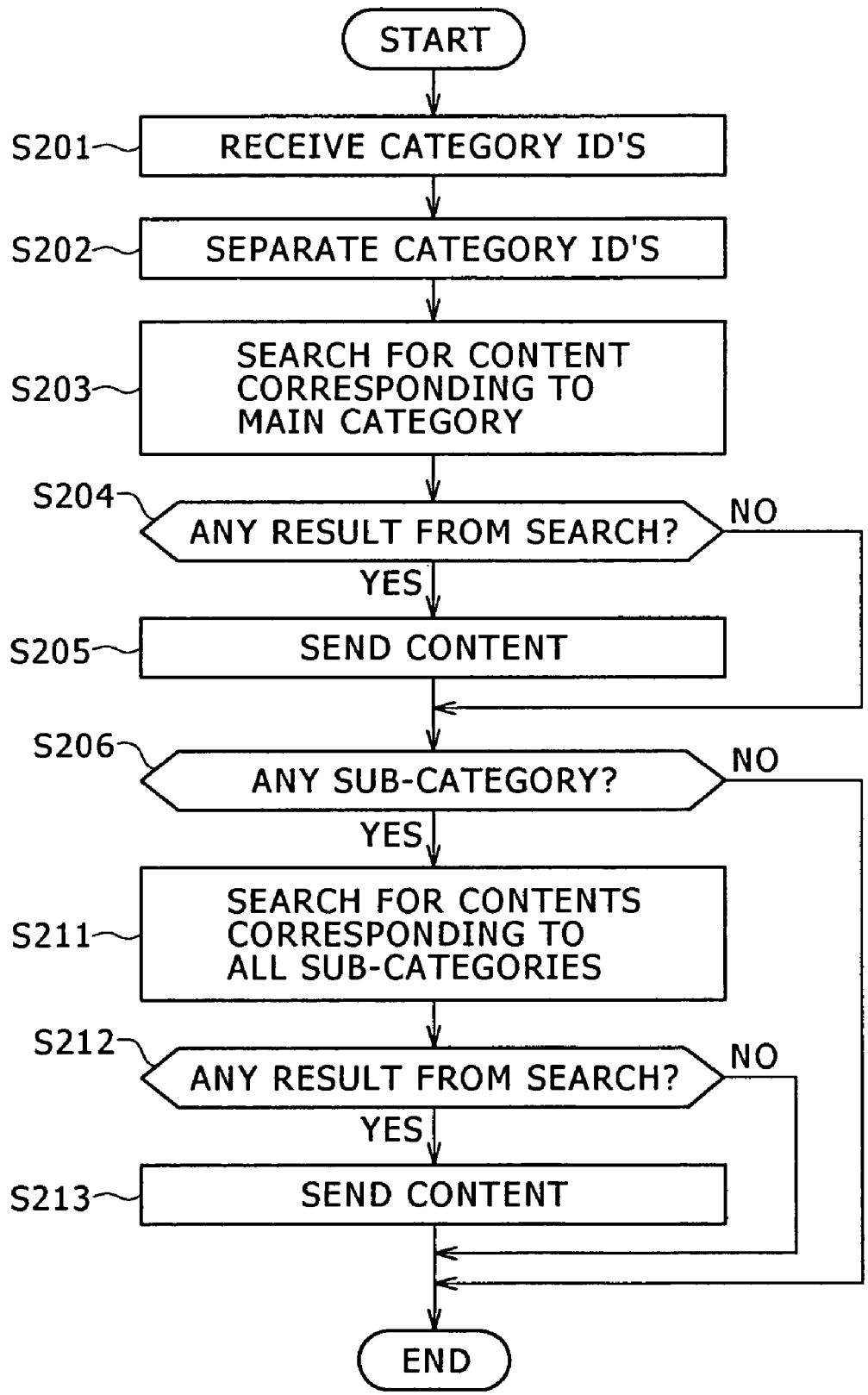
FIG. 9 is a flowchart of other steps performed by the server when contents are sent and received.

FIGS. 8 and 9 are flowcharts of more detailed steps performed by the server when the process of sending and receiving contents explained above with reference to FIG. 7 is taking place. FIG. 8 shows the case where search is carried out for contents that match a plurality of sub-categories on the OR condition, and FIG. 9 indicates the where search is made for contents matching multiple sub-categories on the AND condition.

In step S201 of FIG. 8, category IDs are received from the communication terminal apparatus. In step S202, the category IDs are separated into the ID for the main category and the IDs for the sub-categories as described above. In step S203, the server searches for the content corresponding to the main category through the database 76 (i.e., database 121 in FIG. 1). In step S204, a check is made to determine whether any relevant content has been retrieved. If the content is found to be retrieved ("Yes" in step S204), step S205 is reached. The retrieved content is sent in step S205 that is followed by step S206. If the relevant count is not found in step S204 ("No"), step S206 is reached immediately. In step S206, a check is made to determine whether there are any sub-categories. If sub-categories are found in step S206 ("Yes"), step S207 is reached. If no sub-category is found in step S206 ("No"), then the process is brought to an end. In step S207, the server searches for the contents corresponding to the sub-categories in question through the database 76. In step S208, a check is made to determine whether relevant contents have been retrieved. If the relevant contents are found to be retrieved in step S208 ("Yes"), step S209 is reached. The retrieved contents are sent in step S209 that is followed by step S210. If no relevant content is found in step S208 ("No"), step S210 is reached immediately. In step S210, a check is made to determine whether all sub-categories obtained from the earlier separation of the category IDs have been dealt with. If all sub-categories are found to have been dealt with in step S210 ("Yes"), the whole process is brought to an end. If there exist any sub-categories yet to be dealt with ("No"), then step S207 is reached again and the server searches for the content corresponding to the next sub-category.

In the example of FIG. 8, the search for the contents of all sub-categories was shown carried out on the OR condition. That is, the content corresponding to each of all sub-categories was searched for and retrieved. By contrast, FIG. 9 shows typical steps that the server performs when searching for contents corresponding to all sub-categories in what may be called search on the AND condition.

Steps S201 through S206 in FIG. 9 are the same as those in FIG. 8 and thus will not be described further. If any sub-categories are found to exist in step S206 ("Yes"), step S211 is reached. The server searches for contents corresponding to all sub-categories through the database 76 in step S211 that is followed by step S212. If no sub-category is found in step S206 ("No"), then the process is terminated. In step S212, a check is made to determine whether any relevant content is found ("Yes"). If the relevant content is found to exist in step S212 ("Yes"), step S213 is reached in which the content is sent. The process is then brought to an end. If no content is found in step S212 ("No"), the process is terminated at that point.

In addition to the above-described client-server communication setup, communication terminal apparatuses may exchange contents with one another in what is known as ad-hoc mode. Such an ad-hoc network is implemented by use of a wireless LAN (802.11a, b, g, h, etc.) or through Bluetooth (trademark) arrangements.

Figure 10:
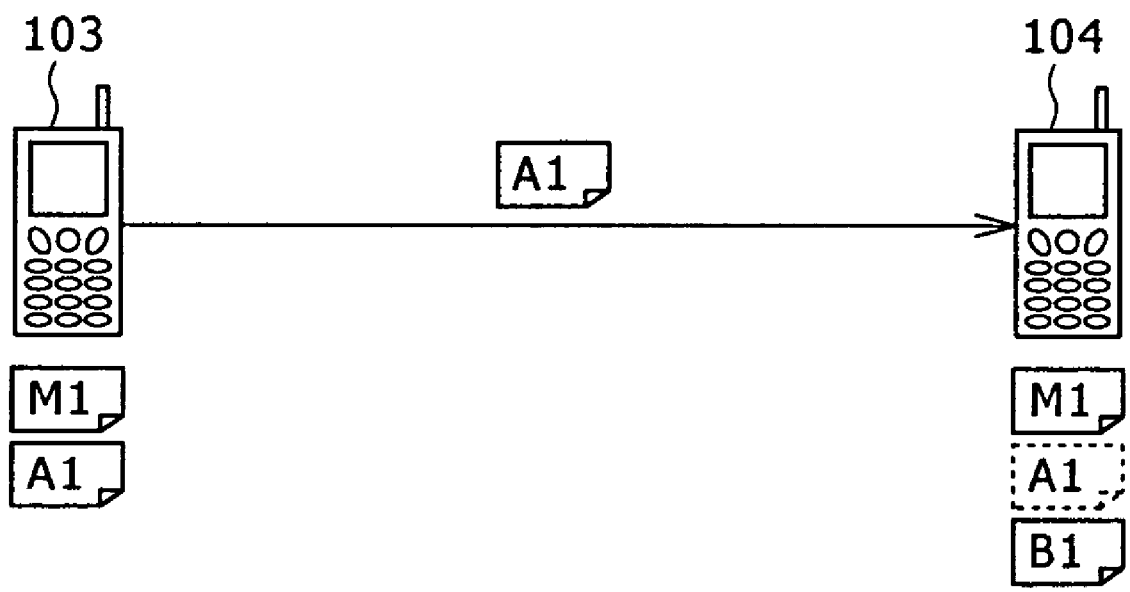
FIG. 10 is a schematic view showing how communication terminal apparatuses communicate with one another.

FIG. 10 schematically shows show a setup in which the communication terminal apparatuses 103 and 104 communicate with each other without the intervention of the above-described server. As with the communication apparatuses 103 and 104 in FIG. 1, it is assumed that the main category M1 is established on each of these communication terminal apparatuses, that the sub-category A1 is set on the apparatus 103, and that the sub-categories A1 and B1 are set on the apparatus 104. It is also assumed that the latest content corresponding to the sub-category A1 is downloaded to and stored in the communication terminal apparatus 103 whereas the latest content of the sub-category A1 has yet to be downloaded to the communication terminal apparatus 104 (i.e., either the content of an older version has been downloaded or no content has been downloaded to the apparatus 104). In other words, the content corresponding to the sub-category A1 is assumed to have been updated since the communication terminal apparatus 104 was last connected to the server via the network. Communications between the communication terminal apparatuses 103 and 104 are conducted illustratively through the wireless interface 44 discussed above with reference to FIG. 5.

In the above setup, the communication terminal apparatuses 103 and 104 connect to each other over an ad-hoc network such as a wireless LAN. At the beginning of the communication, the two apparatuses exchange each other's category IDs (for the main category and sub-categories). The two apparatuses then find out that they share common categories (M1 and A1 in this case). The communication terminal apparatuses 103 and 104 exchange each other's content lists with regard to the common categories. In the setup of FIG. 1, the communication terminal apparatus 103 sends the content lists of the categories M1 and A1 to the other apparatus and the communication terminal apparatus 104 sends the content list of the category M1 to the other party. The communication terminal apparatus 104 then finds out that the communication terminal apparatus 103 is in possession of the latest content of the sub-category A1 not being held by the apparatus 104. The communication terminal apparatus 104 thus requests the apparatus 103 to send the latest content of the sub-category A1. In response to the request, the communication terminal apparatus 103 sends the latest content of the sub-category A1 to the apparatus 104.

Figure 11:
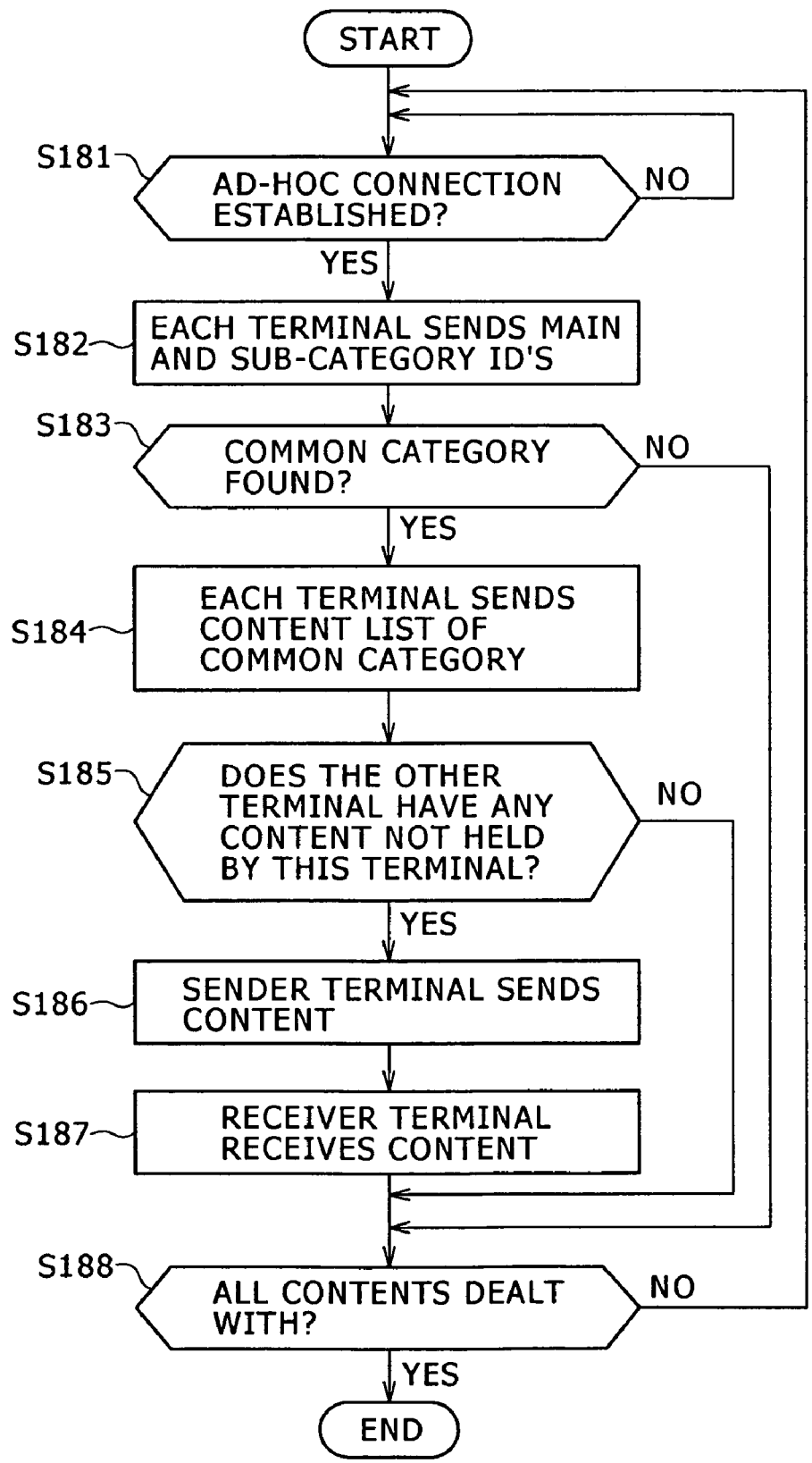
FIG. 11 is a flowchart of steps performed by communication terminal apparatuses for communication therebetween.

The process outlined above is shown in the flowchart of FIG. 11. In step S181 of FIG. 11, a check is made to determine whether an ad-hoc communication has been established. If the ad-hoc communication is found to be established in step S181 ("Yes"), step S182 is reached. In step S182, each communication terminal apparatus sends category IDs (for the main and the sub-categories) to the other apparatus. In step S183, a check is made to determine whether there exists any common category between the connected apparatuses. If any common category is found in step S183 ("Yes"), step S184 is reached. In step S184, each communication terminal apparatus sends the content list of the common category to the other apparatus. In step S185, a check is made to determine whether the other party is in possession of any content not being held by this apparatus. If the other party is found to be in possession of such a content in step S185 ("Yes"), step S186 is reached in which the sending-side apparatus sends the content. In step S187, the receiver-side apparatus receives the content. In step S188, a check is made to determine whether all relevant contents have been sent and received between the apparatuses by way of ad-hoc communication. If all relevant contents are found to have been exchanged in step S188 ("Yes"), the whole process is brought to an end. If all relevant contents have yet to be exchanged in step S188 ("No"), step S181 is reached again. Step S188 is reached immediately if the result of the check in step S183 or in step S185 is negative ("No").

Suppose now that the above-described system is applied to set the national succor teams assuming an international succor game and that the national succor teams are established as the main category on the communication terminal apparatuses of the system. In this case, each communication terminal apparatus may be assigned a given participating country's name as the main category. The apparatuses may be sold or distributed free of charge at stadiums or by ticket agencies. Each user may acquire a communication terminal apparatus with the desired country name established thereon as the main category. There is no need for the user to proceed with complicated steps to make category settings; the user can download from servers or the like those contents related to the favorite national succor team corresponding to the main category. In other words, the user need only purchase or acquire the communication terminal apparatus by specifying the country name as the main category, and the contents associated with the national succor team relevant to the specified country name will be obtained. The sub-categories (players' names and their positions) subsumed under the main category may be set by each user as desired. Such sub-category settings permit acquisition of more contents that will satisfy users who feel something is missing in the contents of the main category. Users of the same taste can smoothly exchange information between their communication terminal apparatuses and thus form a community of people sharing the same interest. This in turn will contribute to expanding the channels of distribution of contents.

To sum up, the above-described embodiment of the present invention involves getting each communication terminal apparatus to send previously assigned category IDs to a server or to another communication terminal apparatus. Given the category IDs, the server or the other communication terminal apparatus searches for any contents corresponding to the categories in question, brings the relevant contents into storage, and sends to the ID-originating communication terminal those of the stored contents which correspond to the received IDs.

The contents above may be any of such variations as music, voice, still pictures, moving pictures, text information, advertisement information, and meta data attached to contents, and any combination of these variations. The category IDs set on the communication terminal apparatus include a main category ID and sub-category IDs that come under the main category. The main category is established fixedly on each communication terminal apparatus beforehand (i.e. when the apparatus is shipped from the factory or when sold), and the user who owns each apparatus is free to set desired sub-category IDs. Alternatively, category IDs may be assigned uniquely to each communication terminal apparatus in advance.

Category IDs may be sent from the communication terminal apparatus to the server automatically at preprogrammed times. Alternatively, the category IDs may be sent from the communication terminal apparatus prior to any request for downloading of contents.

The contents above may be those sent from other users' communication terminal apparatuses and stored into the server before being classified by category and assigned a relevant category ID each on the side of the server. In such a case, when a given user sends a content from his or her communication terminal apparatus to the server, another user's right to access the content in question or contents derived automatically therefrom may be subjected to restrictions.

The contents created automatically by category on the side of the server may include arrangements of music contents, slide shows or movies of picture contents grouped into different categories furnished with different kinds of music accompaniments, and moving pictures of videos with music contents classified by category.

When a search is made through the above-mentioned stored contents for those corresponding to the category IDs, the relevant contents may be selected in order of the number of downloads by other users, in order of popularity vote, and by recommendations of other users. The contents may be accompanied by meta data describing how they were created on the side of the server.

According to the embodiment of the present invention, as described above, the communication terminal apparatus having category IDs established thereon beforehand receives contents corresponding to such category IDs from the server or from another communication terminal apparatus. The category IDs may be assigned music genres, video genres, sports teams, and others. The user need only purchase a communication terminal apparatus that has a previously assigned main category ID representing, say, the user's favorite sports team. After the purchase, the user's apparatus is automatically supplied with contents corresponding to the preset category and the supplied contents are stored inside. The user is free to set desired sub-categories subsumed under the main category. The sub-category settings allow the user automatically to acquire contents that specifically match his or her taste. By delivering contents according to category, the server administrator can pinpoint target users for the distribution of advertisement information. Since communication terminal apparatuses having the same category IDs can exchange contents therebetween, they can form a community of users sharing the same interest. In another setup, a plurality of variations may be derived from each of the contents in diverse categories such as music, video and others sent from communication terminal apparatuses to the server, and these variations may be sent to other users' terminals.

It should be understood by those skilled in the art that various modifications, combinations, sub-combinations and alterations may occur depending on design requirements and other factor in so far as they are within the scope of the appended claims or the equivalents thereof.

What is claimed is:

1. A content communication system comprising:
   a communication terminal apparatus having category IDs; and
   a server delivering contents corresponding to said category IDs;
   wherein said communication terminal apparatus includes:
      an interface to communicate with a module removably coupled to the interface, the module comprising a category holding device, the category holding device comprising a first read-only memory to store unrewritably a first category ID representing a predetermined main category and a second memory to store one or more second category IDs representing a variable number of sub-categories of said main category, the interface being adapted to read the first category ID and the one or more second category IDs from the module and to edit the one or more second category IDs stored on the module;
      first sender means configured to send the first category ID representing said main category and the second category IDs representing said sub-categories to said server;
      first receiver means configured to receive said contents from said server corresponding to the sub-categories; and
      storage means configured to store the contents received by the first receiver means; and
   wherein said server includes:
      second receiver means configured to receive the first and second category IDs from said communication terminal apparatus;
      database means configured to store the contents corresponding to categories;
      search means configured to search for and retrieve from said database means category contents corresponding to the first and second category IDs received by the second receiver means; and
      second sender means configured to send the category contents retrieved from said database means to said communication terminal apparatus.

2. The content communication system according to claim 1,
   wherein said contents are any of such variations as music, voice, still pictures, moving pictures, text information, advertisement information, and meta data attached to contents, and any combination of said variations.

3. The content communication system according to claim 1, wherein
   said communication terminal apparatus is capable of communicating with an other communication terminal apparatus for exchange of the one or more second category IDs retrieved from said module of each communication terminal apparatus, and
   the contents corresponding to the one or more second category IDs received by the first receiver means are retrieved from said storage means and sent from one communication terminal apparatus to the other communication terminal apparatus.

4. The content communication system of claim 1, wherein the communication terminal apparatus further comprises:
- a category input interface to receive first input from a distributor of the communication terminal apparatus of the first category ID representing the main category and to store the first category ID in the module in an unrewritable manner;
- a subcategory input interface to receive second input from a user regarding the second category IDs representing the sub-categories, wherein the subcategory input interface is adapted to permit the second input from the user after the first input from the distributor has been received.

5. The content communication system of claim 4, wherein the first receiver circuit is further configured to receive a listing of said sub-categories from which a set of sub-categories identified by the second category IDs may be selected by the user following receipt of the first input from the distributor.

6. A content communication method for sending and receiving contents between a communication terminal apparatus and a server, said communication terminal apparatus having category IDs, said server delivering the contents corresponding to said category IDs, said content communication method comprising:
- retrieving from a module removably coupled to the communication terminal apparatus a first ID representing a predetermined main category and one or more second IDs representing a variable number of sub-categories of the main category, the module comprising a category holding device, the category holding device comprising a first read-only memory and a second memory, the first ID being unrewritably stored in the first read-only memory;
- sending from said communication terminal apparatus to said server the first ID representing the predetermined main category and the one or more second IDs representing the variable number of sub-categories subsumed under said main category;
- receiving contents from said server by said communication terminal apparatus corresponding to the sub-categories;
- storing the contents received from said server into storage means on said communication terminal apparatus;
- receiving at said server the second IDs representing the variable number of sub-categories from said communication terminal apparatus;
- searching for and retrieving, from database means which stores the contents corresponding to the categories, on the server, the contents the second IDs; and
- sending the contents retrieved from said database means from the server to said communication terminal apparatus.

7. The content communication method according to claim 6, wherein
- said communication terminal apparatus is capable of communicating with an other communication terminal apparatus, the other communication terminal apparatus comprising a second module unrewritably storing a same first ID for a same main category as the predetermined main category, for exchange of second IDs representing sub-categories, and
- when said communication terminal apparatus detects that a second ID received from the other communication terminal apparatus matches a second ID stored in the module of the communication terminal apparatus, the communication terminal apparatus retrieves the contents corresponding to the second ID from said storage means and sends the retrieved contents to the other communication terminal apparatus.

8. A communication terminal apparatus for use with a content communication system comprising said communication terminal apparatus and a server, said communication terminal apparatus having category IDs, said server delivering contents corresponding to said category IDs, said communication terminal apparatus comprising:
- an interface to communicate with a module removably coupled to the interface, the module comprising a category holding device, the category holding device comprising a first read-only memory to store unrewritably a first category ID representing a predetermined main category and a second memory to store one or more second category IDs representing a variable number of sub-categories subsumed under said main category, the interface being adapted to read the first category ID and the one or more second category IDs from the module and to edit the one or more second category IDs stored on the module;
- first communication means configured to send the first category ID representing said main category and the second category IDs representing said sub-categories to said server and to receive first contents from said server corresponding to the sub-categories;
- second communication means configured to send the first category ID representing said main category and the second category IDs representing said sub-categories to another communication terminal apparatus and to receive second contents corresponding to the sub-categories from the other communication terminal apparatus; and
- storage means configured to store the first contents received from said server and the second contents received from the other communication terminal apparatus.

9. The communication terminal apparatus according to claim 8,
wherein said second communication means receives other category IDs from the other communication terminal apparatus, searches for and retrieves local contents, stored on the storage means, corresponding to the other category IDs received from the other communication terminal apparatus, and sends the local contents to the other communication terminal apparatus.

10. A content communication system comprising:
- a communication terminal apparatus having category IDs; and
- a server delivering contents corresponding to said category IDs;
wherein said communication terminal apparatus includes:
- an interface to communicate with a module removably coupled to the interface, the module comprising a category holding device, the category holding device comprising a first read-only memory to store unrewritably a first category ID representing a predetermined main category and a second memory to store one or more second category IDs representing a variable number of sub-categories subsumed under said main category, the interface being adapted to read the first category ID and the one or more second category IDs from the module and to edit the one or more second category IDs stored on the module;
- a first transmission circuit configured to send to said server the first category ID representing said main category and the second category IDs representing said sub-categories subsumed under said main category;
a first receiver circuit configured to receive contents from said server corresponding to said sub-categories; and
at least one third memory configured to store the contents received by the receiver circuit; and
wherein said server includes:
a second receiver circuit configured to receive the first and second category IDs from said communication terminal apparatus;
at least one fourth memory storing at least one database configured to store the contents corresponding to the categories;
at least one processor configured to search for and retrieve from said database device the contents corresponding to said main category and said sub-categories represented by the category IDs received by the second receiver circuit; and
a second transmission circuit configured to send the retrieved contents to said communication terminal apparatus.

11. A communication terminal apparatus for use with a content communication system constituted by said communication terminal apparatus and a server, said communication terminal apparatus having category IDs, said server delivering contents corresponding to said category IDs, said communication terminal apparatus comprising:
an interface to communicate with a module removably coupled to the interface, the module comprising a category holding device, the category holding device comprising a first read-only memory to store unrewritably a first category ID representing a predetermined main category and a second memory to store one or more second category IDs representing a variable number of sub-categories subsumed under said main category, the interface being adapted to read the first category ID and the one or more second category IDs from the module and to edit the one or more second category IDs stored on the module;
a transmission circuit configured to send the first category ID representing said main category and the second category IDs representing said sub-categories subsumed under said main category to said server;
a receiver circuit configured to receive contents from said server corresponding to said sub-categories; and
at least one third memory configured to store the contents received by the receiver device.

12. A content communication system for exchange of content data corresponding to categories between a server and a client terminal,
wherein the client terminal comprises
an interface to communicate with a module removably coupled to the interface, the module comprising a first read-only memory to store unrewritably a first category ID relating to a main category and a second memory to store a set of one or more second category IDs relating to sub-categories of the main category, the interface being adapted to read the first category ID and the one or more second category IDs from the module and to edit the one or more second category IDs stored on the module,
a user interface to receive from a user an indication of one or more selected sub-categories of the main category and for storing the second category IDs corresponding to the selected sub-categories in the second memory;
a first network adapter to communicate over a network to the server, the first network adapter transmitting the first category IDs and the set of second category IDs to the server and receiving from the server content data corresponding to the categories identified by the first category ID and the set of one or more second category IDs, and
a third memory to store the content data received by the network adapter; and
wherein the server comprises
a fourth memory to store the sets of content data corresponding to one or more main categories and one or more sub-categories; and
a second network adapter to communicate over the network to the client terminal, the second network adapter receiving the first and second category IDs from the client terminal and transmitting corresponding content data.

13. The system of claim 12, wherein the first, second, and third memories are different portions of a single memory.

14. A communication terminal for exchanging information with a server, the communication terminal comprising:
an interface to communicate with a module removably coupled to the interface, the module comprising a category holding device, the category holding device comprising a first read-only memory to store unrewritably a first category ID relating to a main category and a second memory to store a set of one or more second category IDs relating to sub-categories of the main category, the interface being adapted to read the first category ID and the one or more second category IDs from the module and to edit the one or more second category IDs stored on the module;
a network adapter to communicate over a network to a second communication terminal, the network adapter transmitting the first category ID and the set of second category IDs to the second communication terminal and receiving from the second communication terminal content data corresponding to the categories identified by the first category ID and the set of one or more second category IDs; and
a third memory to store the content data received by the network adapter.

15. The communication terminal of claim 14, wherein the communication terminal apparatus further comprises:
at least one interactive assembly to receive first input from a distributor of the communication terminal regarding the first category ID representing the main category and to store the first category ID in the module in an unrewritable manner; and
at least one user-interactive assembly to receive second input from a user regarding the second category IDs representing the sub-categories, the at least one user-interactive assembly comprising at least one display device and at least one user input device, wherein the at least one user-interactive assembly is adapted to permit the second input from the user after the first input from the distributor has been received.

16. The communication terminal of claim 15, wherein the network adapter is configured to receive a listing of said sub-categories, corresponding to the main category permanently stored, from which a set of sub-categories identified by the second category IDs may be selected by a user, following receipt of the first input from the distributor.

17. The communication terminal of claim 14, further comprising:
at least one processor adapted to:

determine whether any other communication terminals are in range of the communication terminal;

when other communication terminals are in range, determine whether any subset of the other communication terminals in range share one or more sub-categories with the communication terminals; and when any communication terminals are determined to be in the subset sharing one or more sub-categories with the communication terminal, transmit, using the network adapter, the content data of a shared sub-category to at least one communication terminal that shares the shared sub-category.

18. The communication terminal of claim 14, wherein the apparatus further comprises a second network adapter to communicate over a second network to a server, the second network adapter transmitting the first category ID and the set of second category IDs to the server and receiving from the server content data corresponding to the categories identified by the first category ID and the set of one or more second category IDs, and wherein the third memory further stores the content data received by the second network adapter.

19. A method comprising:

retrieving a first category ID identifying a main category from a first read-only memory of a communication terminal, the first read-only memory storing the first category ID unrewritably, the first memory being disposed within a category holding device of a module removably coupled to the communication terminal;

accepting input from a user regarding one or more second category IDs identifying one or more sub-categories of the main category and storing the second category IDs in a second memory, the second memory being disposed within the category holding device of the module removably coupled to the communication terminal;

transmitting, over a communication network, the first and second category IDs to a second communication terminal;

when a response is received from the second communication terminal indicating a sub-category match, receiving from the second communication terminal content data corresponding to the first and second category IDs; and storing the content data received from the second communication terminal in a third memory.

20. The method of claim 19, further comprising:

when no response is received from the second communication terminal indicating a sub-category match, transmitting, over a second communication network, the first and second category IDs to a remote server;

receiving from the remote computing device content data corresponding to the first and second category IDs; and storing the content data received from the remote computing device in the third memory.

21. The method of claim 19, further comprising:

receiving, over the communication network, other first and second category IDs from the second communication terminal;

determining whether there is a match between the first and second category IDs and the other first and second category IDs, the match being indicative of a commonality of at least one subcategory of the second category IDs and the other second category IDs; and when there is a match, transmitting an indication of the match and content data corresponding to the at least one subcategory indicated by the match to the second communication terminal.

* * * * *